United States Patent
Bohres et al.

(10) Patent No.: US 8,642,185 B2
(45) Date of Patent: Feb. 4, 2014

(54) LEATHER PRODUCTION AND AQUEOUS FORMULATIONS SUITABLE THEREFOR

(75) Inventors: Edward Bohres, Ludwigshafen (DE); Peter Danisch, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 155 days.

(21) Appl. No.: 13/307,461

(22) Filed: Nov. 30, 2011

(65) Prior Publication Data

US 2012/0141815 A1  Jun. 7, 2012

Related U.S. Application Data

(60) Provisional application No. 61/418,934, filed on Dec. 2, 2010.

(51) Int. Cl.
  *C14C 9/04* (2006.01)
  *C08K 5/521* (2006.01)
  *C08L 31/00* (2006.01)
  *C14C 3/22* (2006.01)

(52) U.S. Cl.
  USPC ............. 428/540; 524/556; 524/145; 8/94.33

(58) Field of Classification Search
  USPC ..................... 524/556, 145; 428/540; 8/94.33
  See application file for complete search history.

(56) References Cited

U.S. PATENT DOCUMENTS

| 6,200,640 | B1 * | 3/2001 | Kneip et al. | 427/389 |
| 2007/0078226 | A1 * | 4/2007 | Schneider et al. | 525/242 |
| 2007/0101509 | A1 | 5/2007 | Huffer et al. | |

FOREIGN PATENT DOCUMENTS

| EP | 0 970 148 B1 | 1/2000 |
| EP | 1 087 021 A1 | 3/2001 |
| WO | WO 2005/031007 A1 | 4/2005 |
| WO | WO 2009/030697 A1 | 3/2009 |

OTHER PUBLICATIONS

International Search Report issued Apr. 12, 2012 in PCT/IB2011/055400 filed Dec. 1, 2011.

* cited by examiner

*Primary Examiner* — Michael Bernshteyn
(74) *Attorney, Agent, or Firm* — Oblon, Spivak, McClelland, Maier & Neustadt, L.L.P.

(57) ABSTRACT

A process for producing leather comprises treating part-processed hides, crust leathers or pelts with at least one aqueous float comprising (A) at least one amphiphilic organic copolymer,
(B) at least one silicone compound having at least one carboxylic acid group or at least one carboxylic anhydride group per molecule,
(C) at least one surface-active compound selected from emulsifiers having at least one phosphorus atom per molecule,
(D) at least one surface-active compound selected from N-acylated amino acids,
(E) at least one surface-active compound comprising at least one $C_{10}$-$C_{30}$-alkyl radical, branched or unbranched, or at least one polyisobutene moiety, and at least one ionic or aqueous-ionizable group, other than amphiphilic copolymer (A) and surface-active compound (C), and which is free of waxes and oils.

17 Claims, No Drawings

LEATHER PRODUCTION AND AQUEOUS FORMULATIONS SUITABLE THEREFOR

The present invention relates to a process for producing leather, which comprises treating part-processed hides, crust leathers or pelts with at least one aqueous float comprising
(A) at least one amphiphilic organic copolymer,
(B) at least one silicone compound having at least one carboxylic acid group or at least one carboxylic anhydride group per molecule,
(C) at least one surface-active compound selected from emulsifiers having at least one phosphorus atom per molecule,
(D) at least one surface-active compound selected from N-acylated amino acids,
(E) at least one surface-active compound comprising at least one $C_{10}$-$C_{30}$-alkyl radical, branched or unbranched, or at least one polyisobutene moiety, and at least one ionic or aqueous-ionizable group, other than amphiphilic copolymer (A) and surface-active compound (C),
and which is free of waxes and oils.

The present invention further relates to leather obtained according to the present invention. The present invention further relates to aqueous formulations suitable for performing the process of the present invention.

Leather production may involve the use of polymers during pretannage, tannage and retannage. The polymers in question may perform different functions. They may have a tanning, retanning, hydrophobicizing, fatliquoring or dispersing effect for instance. The choice of polymer may influence/affect the properties of the final leather product. There are different proposals in the literature as to how to choose a polymer.

EP 1 087 021 describes the use of copolymers prepared from a hydrophilic monomer component such as, for example, acrylic acid, methacrylic acid, acrylamide, methacrylamide or maleic anhydride and a hydrophobic monomer component such as, for example, $C_8$-$C_{22}$-alkyl acrylate or $C_8$-$C_{22}$-alkyl methacrylate, and in neutralized state. The copolymers are used as a component in polysiloxane-containing leather treatment compositions. However, leathers obtained using the leather treatment compositions reported in EP 1 087 021 are in some cases observed to have diffusion-based inhomogeneities in fat distribution and hence a mottled coloration, they can look spotty. In addition, some of the leathers produced according to EP 1 087 021 tend to be loose-grained or double-skinned.

WO 2009/030697 discloses formulations that may comprise certain copolymers, silicone compounds and emulsifier and also preferably fats or oils. They are useful for producing leather having very good properties.

Yet it has transpired that working part-processed hides, crust leathers or pelts in hard or very hard water, for example at 20° German hardness or more, for example 60° German hardness, or processing only incompletely delimed pelts can give rise to numerous dyeing and fatliquoring problems. A pullup-like effect must be mentioned here in particular as well as a very unlevel dyeing. Leathers tanned in very hard water is observed to quickly lighten in color when repeatedly flexed, and to be difficult to finish.

The problem addressed by the present invention was therefore that of providing a leather production process whereby obtainable leathers do not have the above-mentioned disadvantages even when produced in hard water or from incompletely delimed pelts. The problem addressed by the present invention was further that of providing leathers which do not have the abovementioned disadvantages, and of providing formulations whereby obtainable leathers exhibit but minimal pullup-like effects despite processing in hard water or use of incompletely delimed pelts.

We have found that the problem is solved by the process defined at the beginning, the invention process for short.

The invention process typically proceeds from part-processed hides, crust leathers or pelts, especially from pickled pelts. Part-processed is to be understood as referring to animal hides which have already been tanned but not yet retanned and not fatliquored. Wet whites and wet blues are examples of part-processed hides. Crust leather may be chrome tanned, vegetable tanned or otherwise chromelessly tanned and chrome, vegetable or otherwise chromelessly retanned and also dried.

Part-processed hides, crust leathers and pelts can come from any desired animals, for example from cattle, pigs, goats, sheep, kangaroos, wild animals, especially deer, from fish or birds, especially from ostriches. For the purposes of the invention process, it is immaterial, for example whether the animals were killed by slaughtering or hunting or alternatively died of natural causes. Conventional methods of pretreatment include for example liming, deliming, baiting, pickling and optionally tanning and also mechanical operations, for example defleshing the hides or skins.

The present invention can proceed from incompletely delimed pelts or from through-delimed pelts, for example from those which turn a reddish-violet color when drizzled with phenolphthalein tincture. If the pelt remains colorless throughout the cross section, by contrast, they can be assumed to be through delimed.

According to the present invention, part-processed hides, crust leathers or pelts are treated with at least one aqueous float comprising
(A) at least one amphiphilic organic copolymer,
(B) at least one silicone compound having at least one carboxylic acid group or at least one carboxylic anhydride group per molecule,
(C) at least one surface-active compound selected from emulsifiers having at least one phosphorus atom per molecule,
(D) at least one surface-active compound selected from N-acylated amino acids,
(E) at least one surface-active compound comprising at least one $C_{10}$-$C_{30}$-alkyl radical, branched or unbranched, or at least one polyisobutene moiety, and at least one ionic or aqueous-ionizable group, other than amphiphilic copolymer (A) and surface-active compound (C),
and which is free of waxes and oils.

By "free of waxes and oils" is meant in the context of the present invention that the aqueous float used in the invention process comprises less than 0.5% by weight, based on entire aqueous float used, of natural or synthetic waxes/oils.

Oils therein are room temperature liquid water-insoluble substances, examples being natural oils, essential oils and synthetics oils.

Examples of natural oils are room temperature liquid triglycerides, for example fish oil, neat's-foot oil, olive oil, cotton seed oil, castor oil, sunflower oil and ground nut oil.

Examples of synthetic oils are white oil, paraffin oil, mineral oil, synthetic oil, functionalized paraffins such as, for example, chlorinated or sulfochlorinated paraffins.

Examples of natural waxes are room temperature solid native triglycerides such as, for example, lanolin, beeswax, shellac wax.

Synthetic waxes in the context of the present invention are hydrophobic synthetic hydrocarbons which are solid at room temperature, melt at a higher temperature, for example in the range from 40 to 150° C., without decomposing, and have a comparatively low viscosity, for example a kinematic melt viscosity v (μ) in the range from 100 to 2000 mm²/s, measured at 100° C., in the melt even at a temperature of just a few ° C. above the melting point.

More particularly, synthetic waxes are such hydrocarbons which are solid at room temperature, but melt at 40° and Hydrophobic in the context of the present invention is to be understood as meaning for example that hydrophobic compounds dissolve in water at less than 0.1 g/l, more particularly in amounts from 0.1 to 1 μg/l, measured at room temperature. Solid hydrophobic compounds for the purposes of the present invention preferably have a room temperature contact angle with water of at least 90° while the surface of the solid hydrophobic surface in question is smooth.

The invention process is carried out by treating part-processed hides, crust leathers or pelts with an aqueous float. Suitable float lengths are for example in the range from 1 to 250%, and preferably at least 50%. Aqueous floats for the purposes of the present invention may comprise altogether up to 40% by volume and preferably altogether up to 20% by volume of one or more organic solvents, for example methanol, ethanol, isopropanol or ethylene glycol. In a particularly preferable version of the present invention, aqueous floats are free of organic solvents.

The invention process is carried out by treating with at least one aqueous float, for example with two or three separate floats comprising hereinbelow described components (A) to (E), preferably with just one aqueous float comprising hereinbelow described components (A) to (E).

By way of component (A) aqueous float used in the invention process comprises (A) at least one amphiphilic organic copolymer, also referred to herein as copolymer (A). Copolymer (A) may be a block copolymer, a graft copolymer or preferably a random copolymer.

Copolymer (A) comprises hydrophilic and hydrophobic units, preferably through inclusion of hydrophilic and hydrophobic comonomers. Suitable hydrophilic comonomers include for example ethylenically unsaturated carboxylic acids, ethylenically unsaturated dicarboxylic acids, anhydrides of ethylenically unsaturated mono- or dicarboxylic acids, and ethylenically unsaturated sulfonic acids.

In one embodiment of the present invention, copolymer (A) further incorporates one or more, preferably two or more different hydrophilic comonomers. Suitable hydrophobic comonomers include for example aromatics having at least one ethylenic double bond, for example para-methylstyrene, α-methylstyrene and especially styrene, α-olefins in the narrower sense, for example ethylene, propylene, 1-butene, 1-pentene, 1-hexene, 1-octene, 1-decene, 1-dodecene, 1-tetradecene, 1-hexadecene, 1-octadecene, 1-eicosene, and also $C_4$-$C_{20}$-alkyl esters of (meth)acrylic acid.

In one embodiment of the present invention, copolymer (A) is selected from such preferably random copolymers obtainable by copolymerization of
(a) at least one ethylenically unsaturated $C_3$-$C_{10}$-carboxylic acid or at least one ethylenically unsaturated $C_4$-$C_{10}$-dicarboxylic acid or its anhydride, also referred to as comonomer (a) for short,
(b) at least one (meth)acrylate of an α-branched $C_3$-$C_{10}$-alkanol, also referred to as comonomer (b) for short,
(c) at least one (meth)acrylate of a primary $C_4$-$C_{20}$-alkanol, also referred to as comonomer (c) for short.

Examples of ethylenically unsaturated $C_3$-$C_{10}$-carboxylic acids (a) are preferably α,β-unsaturated carboxylic acids such as for example (E)- or (Z)-crotonic acid and especially (meth)acrylic acid.

Examples of ethylenically unsaturated $C_4$-$C_{10}$-dicarboxylic acids (a) are maleic acid, fumaric acid, itaconic acid, citraconic acid, metaconic acid, methylenemalonic acid, preferably itaconic acid, fumaric acid and maleic acid and most preferably maleic acid.

Examples of anhydrides (a) are maleic anhydride, itaconic anhydride, citraconic anhydride, methylenemalonic anhydride, preferably itaconic anhydride and maleic anhydride and most preferably maleic anhydride.

In one embodiment of the present invention, copolymer (A) may comprise two or more different ethylenically unsaturated $C_3$-$C_{10}$-carboxylic acids (a) or two or more different ethylenically unsaturated $C_4$-$C_{10}$-dicarboxylic acids (a) or two or more different anhydrides (a) in copolymerized form.

In one embodiment of the present invention, copolymer (A) may comprise an ethylenically unsaturated $C_3$-$C_{10}$-carboxylic acid (a) and an ethylenically unsaturated $C_4$-$C_{10}$-dicarboxylic acid (a) or an anhydride (a) in copolymerized form.

Preferably, however, copolymer (A) comprises just one ethylenically unsaturated $C_3$-$C_{10}$-carboxylic acid (a) or one ethylenically unsaturated $C_4$-$C_{10}$-dicarboxylic acid (a) or one anhydride (a) in copolymerized form.

Copolymer (A) further comprises at least one comonomer (b) in copolymerized form. Comonomer (B) is a (meth)acrylate of an α-branched $C_3$-$C_{10}$-alkanol. α-Branched $C_3$-$C_{10}$-alkanols for the purposes of the present invention are secondary alkanols having 3 to 10 carbon atoms and preferably tertiary alkanols having 4 to 10 carbon atoms, which may be cyclic or preferably noncyclic. The term alkanols thus also comprehends cycloalkanols. Examples of secondary alkanols having 3 to 10 carbon atoms are isopropanol, sec-butanol, sec-pentanol (pentan-2-ol), pentan-3-ol, cyclopentanol, cyclohexanol, sec-hexanol (hexan-2-ol), hexan-3-ol, sec-heptanol (heptan-2-ol), heptan-3-ol, sec-decanol and decan-3-ol. Preferred examples are tert-butanol and tert-amyl alcohol.

In one version of the present invention, copolymer (A) comprises two or more different comonomers (b) in copolymerized form.

Preferably, however, copolymer (A) comprises just one comonomer (b) in copolymerized form.

Particularly preferred comonomers (b) are tert-amyl (meth)acrylate, tert-butyl acrylate and especially tert-butyl methacrylate.

Copolymer (A) further comprises at least one comonomer (c) in copolymerized form. Comonomer (c) is a (meth)acrylate of a primary $C_4$-$C_{20}$-alkanol preferably a primary $C_6$-$C_{18}$-alkanol. Primary $C_4$-$C_{20}$-alkanols for the purposes of the present invention are straight-chain or preferably branched primary alcohols having a primary OH group. Examples of primary $C_4$-$C_{20}$-alkanols are n-butanol, n-pentanol, n-hexanol, n-heptanol, n-octanol, n-nonanol, n-decanol, n-dodecanol, n-tetradecanol, n-hexadecanol, n-octadecanol and n-eicosanol. Examples of branched primary $C_4$-$C_{20}$-alkanols are isobutanol, isopentanol, isohexanol, isooctanol, isostearyl alcohol and isopalmityl alcohol. Examples of preferred primary $C_6$-$C_{18}$-alkanols are 2-ethylhexyl alcohol, 3-n-propylheptyl alcohol, 2-n-propylheptanol, 3-isopropylheptyl alcohol, isooctanol, isostearyl alcohol and isopalmityl alcohol.

In one embodiment of the present invention, at least one comonomer (c) is a (meth)acrylate of a primary β- or γ-(gamma-) branched $C_4$-$C_{20}$-alcohol, very particular preference being given to 2-ethylhexyl alcohol, 2-n-propylheptanol, 3-n-propylheptyl alcohol and 3-isopropylheptyl alcohol.

In one version of the present invention, copolymer (A) comprises two or more different comonomers (c) in copolymerized form.

Preferably, however, copolymer (A) comprises just one comonomer (c) in copolymerized form.

In one embodiment of the present invention, copolymer (A) is obtainable by copolymerization of
(a) altogether from 5% to 30% by weight and preferably from 10% to 25% by weight of ethylenically unsaturated $C_3$-$C_{10}$-carboxylic acid or ethylenically unsaturated $C_4$-$C_{10}$-dicarboxylic acid or its anhydride,
(b) altogether from 5% to 30% by weight and preferably from 10% to 20% by weight of methacrylate of α-branched $C_3$-$C_{10}$-alkanol,
(c) altogether from 40% to 90% by weight and preferably from 55% to 80% by weight of acrylate of primary $C_4$-$C_{20}$-alkanol.

Recitations in % by weight are based on the sum total of copolymerized comonomer (b) and comonomer (c) and ethylenically unsaturated $C_3$-$C_{10}$-carboxylic acid (a) or ethylenically unsaturated $C_4$-$C_{10}$-dicarboxylic acid (a) or anhydride (a).

In one embodiment of the present invention, copolymer (A) may comprise one or more further comonomers (d) in copolymerized form. Examples of suitable comonomers (d) are vinyl esters of $C_1$-$C_{10}$-carboxylic acids, preferably vinyl formate, vinyl propionate and especially vinyl acetate. Further examples of suitable comonomers (d) are vinylaromatics such as for example α-methylstyrene, para-methylstyrene and especially styrene. Further examples of suitable comonomers (d) are $C_6$-$C_{30}$-α-olefins, for example 1-hexene, 1-octene, 1-decene, 1-n-$C_{16}H_{32}$, 1-n-$C_{18}H_{36}$, 1-eicosene and 1-n-docosanol.

In one embodiment of the present invention, copolymer (A) comprises altogether up to 50% by weight and preferably from 1% to 30% by weight of further comonomer (d) in copolymerized form, based on the sum total of comonomer (b) and comonomer (c) and ethylenically unsaturated $C_3$-$C_{10}$-carboxylic acid (a) or ethylenically unsaturated $C_4$-$C_{10}$-dicarboxylic acid (a) or anhydride (a).

In one preferable embodiment of the present invention, copolymer (A) comprises no comonomer (d) in copolymerized form.

In one embodiment of the present invention, copolymer (A) has a room temperature dynamic viscosity in the range from 50 to 4000 mPa·s and preferably in the range from 75 to 2500 mPa·s, determined to DIN EN ISO 2555 (Brookfield DV-E viscometer, spindle no. 3 of RV spindle set, 50 rpm).

In one embodiment of the present invention, copolymerized ethylenically unsaturated $C_3$-$C_{10}$-carboxylic acid (a) or copolymerized ethylenically unsaturated $C_4$-$C_{10}$-dicarboxylic acid (a) is in an at least partially neutralized form.

In one embodiment of the present invention, copolymerized anhydride of ethylenically unsaturated $C_4$-$C_{10}$-dicarboxylic acid (a) is in an at least partially hydrolyzed and optionally at least partially neutralized form.

The invention process further utilizes
(B) at least one silicone compound having at least one carboxylic acid group or at least one carboxylic anhydride group per molecule, also referred to as silicone compound (B) or component (B) for short.

In one embodiment, silicone compound (B) includes structure elements of formulae (II) and (III) and optionally structure elements (IV a) and/or (IV b).

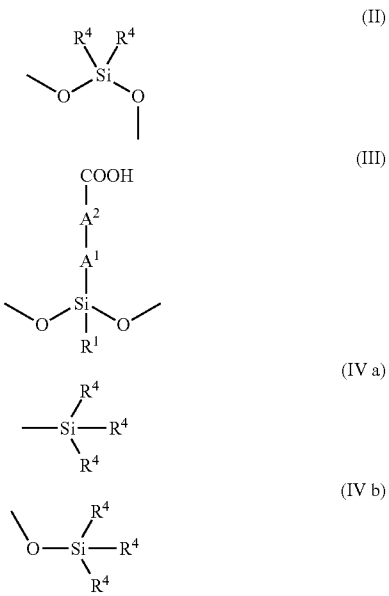

The structure elements designated above are each arranged such that Si—O—Si—O chains are formed. The formation of Si—Si groups is theoretically possible, but in most cases plays a minor role.

In formulae (II), (III), (IV a) and (IV b), the variables are defined as follows:

$R^4$ in each occurrence is the same or different and independently a hydrogen, hydroxyl, $C_1$-$C_4$-alkyl, such as methyl, ethyl, n-propyl, isopropyl, n-butyl, isobutyl, sec-butyl and tert-butyl; especially methyl;

$C_6$-$C_{14}$-aryl, for example phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl, more preferably phenyl;

$C_1$-$C_4$-alkoxy, such as methoxy, ethoxy, n-propoxy, isopropoxy, n-butoxy, isobutoxy, sec-butoxy, tert-butoxy;

amino, mono-$C_1$-$C_4$-alkylamino, for example —$NHCH_3$, —$NHC_2H_5$, —$NH(CH_2)_2CH_3$, —$NH(CH_2)_3CH_3$, —NH—$CH(CH_3)_2$, $NHC(CH_3)_3$;

di-$C_1$-$C_4$-alkylamino, —$N(CH_3)_2$, —$N(C_2H_5)_2$, —$N(CH_3)(C_2H_5)$, —$N[(CH_2)_2CH_3]_2$, —$N(CH_3)CH(CH_3)_2$, or $A^1$-$A^2$-COOH.

In one preferable embodiment of the present invention, each $R^4$ is the same and methyl.

In another preferable embodiment, the structure elements (II) are all the same and each structural element (II) has one $R^4$ being methyl and the other $R^4$ being phenyl.

In one embodiment of the present invention, the structure elements of formula (IV a) are selected from the following groups: $Si(CH_3)_3$, $Si(CH_3)_2C_6H_5$, $Si(CH_3)_2OH$, $Si(CH_3)C_6H_5OH$.

In one embodiment of the present invention, the structure elements of formula (IV a) or (IV b) each have two $R^4$'s being the same and selected from $CH_3$ and $C_6H_5$ and the third $R^4$ being $A^1$-$A^2$-COOH.

$A^1$ is
a direct bond,
oxygen,
an amino group of formula $—NR^5—$
a carbonyl group,
an amido group of formula $—NR^5—CO—$ or $—CO—NR^5—$
or
an ester group of formula $CO—O$ or $O—CO$;

$R^5$ in each occurrence is the same or different and independently selected from hydrogen,
$C_1$-$C_4$-alkyl, such as methyl, ethyl, n-propyl, isopropyl, n-butyl, isobutyl, sec-butyl and tert-butyl.

$A^2$ in each occurrence is the same or different and is linear or branched $C_5$-$C_{25}$-alkylene, unsubstituted or substituted with one or more $C_1$-$C_4$-alkyl or phenyl substituents, for example $—(CH_2)_5—$, $—(CH_2)_6—$, $—(CH_2)_7—$, $—(CH_2)_5—$, $—(CH_2)_9—$, $—(CH_2)_{10}—$, $—(CH_2)_{11}—$, $—(CH_2)_{12}—$, $—(CH_2)_{13}—$, $—(CH_2)_{14}—$, $—CH(CH_3)—CH_2—CH_2—CH_2—CH(CH_3)—$, $—C(CH_3)_2—CH_2—CH_2—CH_2—CH(CH_3)—$; $—CH(C_6H_6)—CH_2—CH_2—CH_2—CH(CH_3)—$; preferably $—(CH_2)_8—$, $—(CH_2)_9—$, $—(CH_2)_{10}—$, $—(CH_2)_{11}—$, $—(CH_2)_{12}—$, wherein $C_5$-$C_{25}$-alkylene may be interrupted by from 1 to 8 oxygen atoms not directly connected to each other.

Silicone compound (B), which comprises the structure elements of the general formulae (II), (III) and also optionally (IV a) and/or (IV b), may be linear or have a cyclic or branched structure. Branched silicone compound (B), which comprises the structure elements (II), (III) and also optionally (IV a) and/or (IV b), generally further comprises structure elements for example of formula (V a) or (V b)

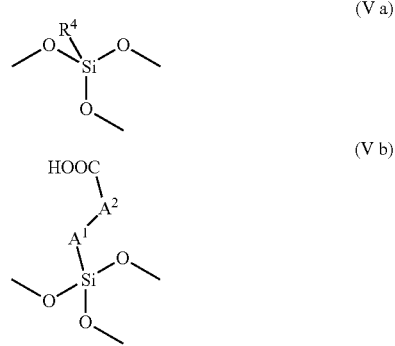

(V a)

(V b)

where the variables are each as defined above. Cyclic unbranched silicone compound (B), which comprises the structure elements of the general formula (II) and (III), typically comprises neither structure elements of formula (IV a) nor structure elements of formula (IV b).

The structure elements (II), (III), optionally (V a) and (V b) may form an alternating, blockwise and preferably random distribution in silicone compound (B).

In one embodiment of the present invention, silicone compound (B) comprises from 1 to 50, preferably from 2 to 25 and more preferably on average from 2.5 to 15 carboxyl groups per molecule.

In one embodiment of the present invention, the molecular weight $M_w$ of silicone compound (B) is in the range from 5000 g to 150 000 g/mol and preferably in the range from 10 000 to 100 000 g/mol.

Molecular weight may be determined using methods known to a person skilled in the art, for example using light-scattering methods or viscosity determinations.

In one embodiment of the present invention, the carboxylic acid groups in silicone compound (B) are wholly or at least to a certain extent partly, for example one-third or half, in a neutralized state. Useful neutralizing agents include for example basic salts such as hydroxides or carbonates of alkali metals such as Na or K for example. Useful neutralizing agents further include ammonia, alkylamines such as for example methylamine, dimethylamine, trimethylamine, ethylamine, diethylamine, triethylamine, ethylenediamine, alkanolamines such as for example ethanolamine, diethanolamine, triethanolamine, N-methylethanolamine, N-methyldiethanolamine or N-(n-butyl)-diethanolamine.

By way of component (C), aqueous float used in the invention process comprises (C) at least one surface-active compound selected from emulsifiers having at least one phosphorus atom per molecule, also called emulsifier (C) for short.

Emulsifiers (C) are preferably selected from phosphates of alkoxylated and especially ethoxylated alkanols (alkyl $C_{12}$-$C_{30}$, preferably $C_{16}$-$C_{20}$, degree of alkoxylation, preferably ethoxylation, from 2 to 10 and preferably from 3 to 5), and from phosphates of alkoxylated and especially ethoxylated alkenols (alkenyl $C_{12}$-$C_{30}$, preferably $C_{14}$-$C_{20}$, with one to three C—C double bonds, degree of alkoxylation, preferably ethoxylation, from 2 to 10 and preferably from 3 to 5). Phosphates of alkoxylated and especially ethoxylated alkanols/alkenols may be in the state of partial or complete neutralization, for example with basic alkali metal compound, especially with potassium hydroxide or sodium hydroxide, or with organic amine, especially with ethanolamine, diethanolamine, N-methylethanolamine or triethanolamine.

Preferred examples of $C_{12}$-$C_{30}$-alkyl are n-$C_{12}$-$C_{30}$-alkyl, especially lauryl (n-$C_{12}H_{25}$), myristyl (n-$C_{14}H_{29}$), palmityl (n-$C_{16}H_{33}$) and stearyl (n-$C_{18}H_{37}$). Preferred examples of $C_{12}$-$C_{30}$-alkenyl are cis-octadec-9-enyl, cis,cis-octadeca-9,12-dienyl and all-cis-octadeca-9,12,15-trienyl.

In one embodiment of the present invention, emulsifier (C) comprises at least one compound of the general formula (VI) or (VII),

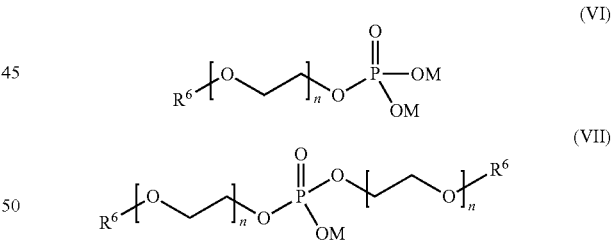

(VI)

(VII)

M in each occurrence is the same or different and selected from hydrogen, alkali metal, especially sodium or potassium, further ammonium, unsubstituted or organic ammonium, especially organic ammonium derived from ethanolamines, for example ethanolammonium, diethanolammonium, triethanolammonium, N-methylethanolammonium, N,N-dimethylethanolammonium.

$R^6$ in each occurrence is different or preferably the same and selected from $C_{12}$-$C_{30}$-alkyl, $C_{12}$-$C_{30}$-alkenyl with one to three C—C double bonds, preferably $C_{16}$-$C_{20}$-alkyl or $C_{14}$-$C_{20}$-alkenyl with one to three C—C double bonds, wherein the double bond(s) in $C_{12}$-$C_{30}$-alkenyl are preferably cis.

n in each occurrence is different or preferably the same and from 2 to 10 and preferably from 3 to 5.

By way of component (D), aqueous float used in the invention process comprises (D) at least one surface-active compound selected from N-acylated amino acids, also called emulsifier (D) for short.

Useful N-acylated β-amino acids and especially N-acylated α-amino acids include for example those of formula (I)

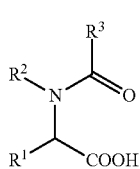

and their corresponding alkali metal or ammonium salts, in each of which the variables are defined as follows:

$R^1$ is selected from
hydrogen,
$C_1$-$C_4$-alkyl, such as methyl, ethyl, n-propyl, isopropyl, n-butyl, isobutyl, sec-butyl and tert-butyl, especially methyl;
$C_6$-$C_{14}$-aryl, for example phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl and more preferably phenyl;
$R^2$ is selected from hydrogen and preferably $C_1$-$C_4$-alkyl, such as methyl, ethyl, n-propyl, isopropyl, n-butyl, isobutyl, sec-butyl and tert-butyl; especially methyl.

The CO—$R^3$ group is typically derived from saturated or unsaturated fatty acids. Saturated fatty acids are carboxylic acids having $C_9$-$C_{20}$-alkyl groups, which may be linear or branched, substituted or unsubstituted. $R^3$ may be for example: n-nonyl, n-decyl, n-dodecyl, n-tetradecyl, n-pentadecyl, n-octadecyl, n-eicosyl.

CO—$R^3$ may be derived from an unsaturated fatty acid having 9 to 20 carbon atoms and 1 to 5 C—C double bonds, in which case the C—C double bonds can be for example isolated or allylic, for example the acyl moiety of linoleic acid, of linolenic acid and most preferably of oleic acid.

In one embodiment of the present invention, the carboxylic acid groups in N-acylated amino acid used as emulsifier (D) are wholly or at least to a certain extent partly, for example one-third or half, in a neutralized state. Useful neutralizing agents include for example basic salts such as hydroxides or carbonates of alkali metals such as Na or K for example. Useful neutralizing agents further include ammonia, alkylamines such as for example methylamine, dimethylamine, trimethylamine, ethylamine, diethylamine, triethylamine, ethylenediamine, and most preferably alkanolamines such as for example ethanolamine, diethanolamine, triethanolamine, N-methylethanolamine, N-methyldiethanolamine or N-(n-butyl)-diethanolamine.

Exemplary representatives of compounds of formula (I) are N-oleylsarcosine, N-stearylsarcosine, N-lauroylsarcosine and N-isononanoylsarcosine and also the respective sodium salts, ethanolammonium salts, diethanolammonium salts and also N-methyldiethanolammonium salts.

By way of component (E), also called (co)polymer (E) for short, aqueous float used in the invention process comprises at least one surface-active compound comprising at least one $C_{10}$-$C_{30}$-alkyl radical, branched or unbranched, or at least one polyisobutene moiety, and at least one ionic or aqueous-ionizable group. (Co)polymer (E) is other than amphiphilic copolymer (A) and than surface-active compound (C).

Ionic groups in connection with (co)polymer (E) are for example sulfonic acid groups, —N($C_2H_5$)— groups, —N($CH_3$)_3 groups and especially carboxylate groups.

Aqueous-ionizable groups in connection with the (co)polymer (E) are for example carboxylic acid groups and succinic anhydride groups. Succinic anhydride groups readily form ionic groups in aqueous solution by hydrolysis and deprotonation.

In one embodiment of the present invention, (co)polymer (E) has an average molecular weight $M_n$ in the range from 500 to 5500 g/mol and preferably in the range from 800 to 2300 g/mol.

Polyisobutene moieties in the context of the present invention are branched alkyl radicals comprising an essentially alternating arrangement of $CH_2$ groups and $C(CH_3)_2$ groups.

(Co)polymer (E) having at least one $C_{10}$-$C_{30}$-alkyl radical is obtainable by homo- or copolymerization of $C_{12}$-$C_{32}$-alkene for example. Useful comonomers include one or more olefins, for example ethylene, propylene, 1-butene, 1-hexene, 1-octene, 1-decene, 1-dodecene, especially ethylene and propylene, and styrene. In embodiments of this kind, (co)polymer (E) is constructed of $C_{12}$-$C_{32}$-alkene and optionally ethylene, propylene, 1-butene, 1-hexene, 1-octene, 1-decene or styrene.

(Co)polymer (E) having one or more isobutene moieties is obtainable by homo- or copolymerization of isobutene. Useful comonomers include one or more 1-olefins, preferably ethylene, propylene, 1-butene, 1-hexene, 1-octene, 1-decene, 1-dodecene, styrene, especially 1-propylene. In embodiments of this kind, (co)polymer (E) is constructed of isobutene and optionally ethylene, propylene, 1-butene, 1-hexene, 1-octene, 1-decene, 1-dodecene or styrene.

In one embodiment of the present invention, (co)polymer (E) is a copolymer obtainable by copolymerization of $C_{12}$-$C_{32}$-alkene or isobutene with altogether up to 25% by weight of one or more comonomers selected from ethylene, propylene, 1-butene, 1-hexene, 1-octene, 1-decene or—in the case of isobutene as main comonomer present—1-dodecene.

In one embodiment of the present invention, (co)polymer (E) has a polyisobutyl moiety and one or two carboxylic acid groups per molecule.

In one other embodiment of the present invention, (co)polymer (E) is a functionalized (co)polymer. This is to be understood as meaning that a (co)polymer of $C_{12}$-$C_{32}$-alkene or isobutene, as described above, is used in a modified form resulting from introduction of one or more functional groups. Functional groups may be introduced by polymer-analogous reactions in particular. (Co)polymers of $C_{12}$-$C_{32}$-alkene or isobutene which have been converted by polymer-analogous reactions such as hydroborations, oxidations and especially ene reactions with ethylenically unsaturated mono- or dicarboxylic acids or anhydrides thereof can preferably be used for this C—C double bonds remaining after the (co)polymerization process. Examples of ethylenically unsaturated mono- or dicarboxylic acids and anhydrides thereof are acrylic acid, methacrylic acid, itaconic anhydride, maleic acid and especially maleic anhydride.

In one particularly preferred embodiment of the present invention, (co)polymer (E) is a polyisobutene functionalized by ene reaction with acrylic acid or preferably with maleic acid or maleic anhydride.

The invention process can be carried out using for example from 0.1% to 30% by weight of copolymer (A), based on the (split) weight of the pelt, pickled pelt or part-processed hide in question.

The invention process can be carried out using for example from 0.01% to 20% by weight of silicone compound (B), based on the split weight of the pelt, pickled pelt or part-processed hide in question.

The invention process can be carried out using for example from 0.01% to 20% by weight of emulsifier (C), based on the split weight of the pelt, pickled pelt or part-processed hide in question.

The invention process can be carried out using for example from 0.01% to 20% by weight of emulsifier (D), based on the split weight of the pelt, pickled pelt or part-processed hide in question.

The invention process can be carried out using for example from 0.01% to 30% by weight of (co)polymer (E), based on the split weight of the pelt, pickled pelt or part-processed hide in question.

In one embodiment of the present invention, the aqueous float used in the invention process has an active content of 0.1% to 50% by weight and preferably up to 15% by weight, all based on the pelt/part-processed hide to be treated.

The invention process can be carried out in soft or in hard water. Even water above 20° German hardness is suitable for example. Even extremely hard water having for example a hardness above 60° German hardness and especially up to 200° German hardness is suitable.

The invention process can be performed for example as a tanning process, as a retanning process or as a water-repellent process.

The invention process is generally practiced by letting at least one aqueous float comprising the abovementioned components (A) to (E) act on pelt, especially pickled pelt, or part-processed hide. The invention process is preferably performed at a pH of 2.5 to 11 and more preferably between 4.5 and 6, although it is frequently observed that the pH can rise by about 0.3 to three units during the practice of the invention process.

The invention process is generally carried out at temperatures of 10 to 60° C. and preferably at 20 to 40° C. A duration of 10 minutes to 12 hours has proved advantageous and from one to three hours were proved preferable. The invention process can be carried out in any desired vessels customary in tannage, for example by agitation in barrels or in rotating drums.

The invention tanning process is generally carried out at temperatures of 10 to 45° C. and preferably at 20 to 30° C. A duration of 10 minutes to 12 hours will prove advantageous and from one to three hours will prove preferable. The invention tanning process can be carried out in any desired vessels customary in tannage, for example by agitation in barrels or in rotating drums.

One version of the invention tanning process further utilizes one or more conventional tanning agents, for example chrome tannin, mineral tannin, syntan, polymer tannin or vegetable tannin, as described for example in *Ullman's Encyclopedia of Industrial Chemistry*, volume A15, pages 259 to 282 and especially page 268 et seq., 5th edition, (1990), Chemie Weinheim. The weight ratio of copolymer (A): conventional tanning agent, or sum total of the conventional tanning agents, is advantageously from 0.01:1 to 100:1. One advantageous version of the invention process comprises adding just a few ppm of conventional tanning agent to the above-described floats. However, it is particularly advantageous to entirely dispense with the admixture of conventional tanning agents.

The invention process for producing leather may preferably be practiced as a process for retanning leather using aqueous float comprising components (A) to (E), hereinafter also called invention retanning process. The invention retanning process proceeds from part-processed hides which have been tanned conventionally, i.e., for example with chrome tannins, mineral tannins, polymer tannins, aldehydes, syntans or resin tannins. To practice the invention retanning process, aqueous float comprising components (A) to (E) is allowed to act on part-processed hides.

One version proceeds from part-processed hides obtained by the invention tanning process.

The invention retanning process can be carried out under otherwise customary retanning conditions. It is advantageous to use one or more, i.e., for example from 2 to 6, soaking steps and to rinse with water between the soaking steps. The temperature of the individual soaking steps is in each case from 5 to 60° C. and preferably from 20 to 45° C. It is advantageous to use further agents customarily used during retanning, for example fatliquors, retannins based on resin and vegetable tannins, fillers, leather dyes or emulsifiers.

The invention water-repellent process is generally practiced by letting at least one aqueous float comprising the abovementioned components (A) to (E) act on pelt, especially pickled pelt, or part-processed hide. The invention water-repellent process is preferably performed at a pH of 2.5 to 11 and more preferably between 4.5 and 6, although it is frequently observed that the pH can rise by about 0.3 to three units during the practice of the invention water-repellent process.

The invention water-repellent process is generally carried out at temperatures of 10 to 60° C. and preferably at 20 to 40° C. A duration of 10 minutes to 12 hours will prove advantageous and from one to three hours will prove preferable. The invention process can be carried out in any desired vessels customary in tannage, for example by agitation in barrels or in rotating drums.

The invention water-repellent process can be carried out under otherwise customary water-repellent process conditions. It is advantageous to use one or more, i.e., for example from 1 to 6, soaking steps and to rinse with water between the soaking steps. The temperature of the individual soaking steps is in each case from 5 to 60° C. and preferably from 20 to 40° C. It is advantageous to use further agents customarily used during retanning, for example fatliquors, retannins based on resin and polymer tannins, syntan tannins, vegetable tannins, fillers, leather dyes or emulsifiers.

A further aspect of the present invention provides leathers obtained by the invention tanning process or the invention retanning process or by a combination of the invention tanning process and the invention retanning process. The leathers of the present invention are notable for a comprehensive advantageousness, for example in that they are particularly soft and tight-grained. The leathers of the present invention comprise copolymer (A), (co)polymer (E) and silicone compound (E) and optionally used leather dye in a particularly uniform distribution throughout the cross section. Moreover, leathers of the present invention do not tend to form fatty spots.

A further aspect of the present invention is the use of leathers of the present invention for production of apparel pieces, furniture or automotive interior components. Apparel pieces for the purposes of the present invention include for example jackets, pants, shoes, gloves, belts or braces. Furniture in the context of the present invention is to be understood as furniture comprising constituent parts composed of leather. Armchairs, chairs and sofas for instance may be mentioned as examples of sitting furniture. Automotive interior components are for example auto seats, steering wheel covers and dashboard covers.

A further aspect of the present invention provides apparel pieces comprising or obtained from leathers which are in accordance with the present invention. A further aspect of the present invention provides furniture comprising or obtained from leathers which are in accordance with the present invention. A further aspect of the present invention provides automotive interior components comprising or obtained from leathers which are in accordance with the present invention.

A further aspect of the present invention provides aqueous formulations, referred to as invention aqueous formulations for short, for example aqueous solutions, dispersions or especially emulsions, comprising (A) at least one amphiphilic organic copolymer,
(B) at least one silicone compound having at least one carboxylic acid group or at least one carboxylic anhydride group per molecule,
(C) at least one surface-active compound selected from emulsifiers having at least one phosphorus atom per molecule,
(D) at least one surface-active compound selected from N-acylated amino acids,
(E) at least one (co)polymer comprising at least one $C_{10}$-$C_{30}$-alkyl radical, branched or unbranched, or at least one polyisobutene moiety, other than amphiphilic copolymer (A).

Invention aqueous formulations are free of oils and waxes. Invention aqueous formulations are very useful for performing the invention process.

Components (A) to (E) are described above.

In one embodiment of the present invention, an aqueous float for the invention process is prepared by invention aqueous formulation being diluted with water and optionally admixed with one or more conventional tanning agents or leather dyes.

In one embodiment of the present invention, invention aqueous formulations have a solids content in the range from 10 to 85%, preferably 20 to 65% and more preferably at least 25% by weight.

In one embodiment of the present invention, (co)polymer (E) has a polyisobutyl moiety and one or two carboxylic acid groups per molecule.

In one embodiment of the present invention, invention aqueous formulations have a pH in the range from 3 to 10 and preferably in the range from 4 to 8.

In one embodiment of the present invention, amphiphilic organic copolymer (A) is obtainable by copolymerization of the following comonomers:
(a) at least one ethylenically unsaturated $C_3$-$C_{10}$-carboxylic acid or at least one ethylenically unsaturated $C_4$-$C_{10}$-dicarboxylic acid or its anhydride,
(b) at least one (meth)acrylate of an α-branched $C_3$-$C_{10}$-alkanol,
(c) at least one (meth)acrylate of a primary $C_4$-$C_{20}$-alkanol.

In one embodiment of carboxylic acid (a) selected from (meth)acrylic acid, especially acrylic acid.

In one embodiment of the present invention, at least one comonomer (b) is a methacrylate of a tertiary $C_4$-$C_{10}$-alkanol.

In one embodiment of the present invention, at least one comonomer (c) is an acrylate of a primary β- or γ-branched $C_4$-$C_{20}$-alcohol.

In one embodiment of the present invention, at least one comonomer (b) is a methacrylate of a tertiary $C_4$-$C_{10}$-alkanol and at least one comonomer (c) is an acrylate of a primary β- or γ-branched $C_4$-$C_{20}$-alcohol.

In one embodiment of the present invention, silicone compound (B) is selected from polysiloxanes comprising structure elements of formulae (II), (III) and optionally (IV a) and (IV b)

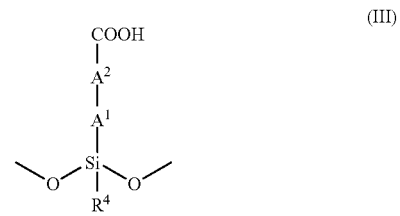

where the variables are defined as follows:

$R^4$ in each occurrence is the same or different and independently is hydrogen, hydroxyl, $C_1$-$C_4$-alkyl, $C_6$-$C_{14}$-aryl, $C_1$-$C_4$-alkoxy, amino, mono-$C_1$-$C_4$-alkylamino, di-$C_1$-$C_4$-alkylamino or $A^1$-$A^2$-COOH, $A^1$ is a direct bond, oxygen or an amino, carbonyl, amido or ester group, $A^2$ in each occurrence is the same or different and is linear or branched $C_5$-$C_{25}$-alkylene.

In one embodiment of the present invention, silicone compound (B) may additionally have structure elements for example of formula (V a) or (V b)

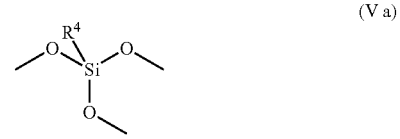

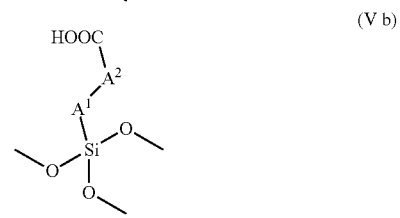

in each of which the variables are as defined above.

In one embodiment of the present invention, emulsifier (C) is selected from phosphates of alkoxylated and especially ethoxylated alkanols (alkyl $C_{12}$-$C_{30}$, preferably $C_{16}$-$C_{20}$, degree of alkoxylation, preferably ethoxylation, from 2 to 10 and preferably from 3 to 5), and from phosphates of alkoxylated and especially ethoxylated alkenols (alkenyl $C_{12}$-$C_{30}$, preferably $C_{14}$-$C_{20}$, with one to three C—C double bonds, degree of alkoxylation, preferably ethoxylation, from 2 to 10 and preferably from 3 to 5).

In one embodiment of the present invention, emulsifier (D) is selected from at least one compound of the general formula (I)

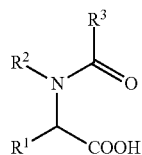

or its corresponding alkali metal or ammonium salt, where, in formula (I), the variables are defined as follows:

$R^1$ is selected from hydrogen, $C_1$-$C_4$-alkyl and $C_6$-$C_{14}$-aryl, $R^2$ is selected from hydrogen or $C_1$-$C_4$-alkyl, CO—$R^3$ is selected from acyl radicals derived from mono- or polyethylenically unsaturated fatty acids or from saturated fatty acids.

In one embodiment of the present invention, (co)polymer (E) has an average molecular weight $M_n$ in the range from 500 to 2500 g/mol and preferably in the range from 800 to 2300 g/mol.

In one embodiment of the present invention, (co)polymer is a functionalized (co)polymer.

The invention is elucidated by working examples.

I. Production of Invention Aqueous Formulations

The following components were used:

(A.1): Copolymer from example I.1.2, WO 2009/030697

(A.2): Copolymer from example I.2.2, WO 2009/030697

(A.3): Copolymer from example I.6.2, WO 2009/030697

(B.1): Polysiloxane of formula

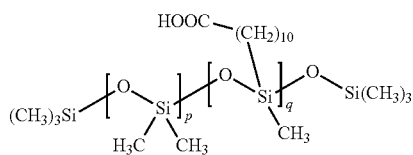

as random cocondensate with q=3 and p=145 (on average in each case), kinematic viscosity 600 mm$^2$/s at 20° C.

(C.1): Mixture of monoesters and diesters of phosphoric acid with ethoxylated oleyl alcohols comprising as main component $CH_3(CH_2)_7$—CH=CH—$(CH_2)_8$—O—$(CH_2CH_2O)_3$—P(O)(OH)$_2$, C—C double bond in (Z)-configuration; CAS No. 91254-26-1

(C.2): Mixture of monoesters and diesters of phosphoric acid with ethoxylated fatty alcohols, CAS No. 106233-09-4

(D.1): sodium salt of N-oleylsarcoside (E.1): Polyisobutene reacted with one equivalent of maleic acid by ene reaction, kinematic melt viscosity: 40° C.: 27 900 mm$^2$/s, each determined to DIN 51562. Saponification number 87 mg KOH/g. $M_n$: 1000 g/mol.

Comparator wax (V-E.2): Paraffin slack wax, melting point 36 to 38° C.

Components (A) to (E) were used to prepare aqueous formulations having compositions as per Table 1.

TABLE 1

| Composition of invention aqueous formulations EM.1 to EM.8 | | | | | |
|---|---|---|---|---|---|
| Formulation | (A) | (B.1) | (C) | (D.1) | (E) |
| EM.1 | (A.1), 15 | 2 | (C.1), 4 | 2.5 | (E.1), 6 |
| EM.2 | (A.1), 20 | 4 | (C.1), 5 | 4 | (E.1), 5 |
| EM.3 | (A.2), 20 | 2 | (C.2), 8 | 8 | (E.1), 4 |
| EM.4 | (A.3), 20 | 2 | (C.2), 8 | 8 | (E.1), 4 |
| EM.5 | (A.1), 15 | 1 | (C.2), 5 | 5 | (E.1), 3 |
| V-EM.6 | (A.1), 15 | 1 | (C.1), 3 | — | (V-E.2) 15 |
| V-EM.7 | (A.2), 15 | 2 | (C.1), 3 | — | (V-E.2) 15 |
| V-EM.8 | (A.3), 15 | 1 | (C.1), 3 | — | (V-E.2) 20 |

Amounts reported in % by weight are each based on active content of entire emulsion A premix was prepared for component (D), this premix consisting of 72% by weight of completely ion-free water, 8% by weight of a 25% solution of NaOH in water as well as 20% by weight of component (D).

To prepare aqueous formulations EM.1 to EM-5, completely ion-free water was initially charged at 30% by weight, based on the emulsion to be prepared. Components (D), (B) and (E.1) were added and the mixture was heated to 70° C.

The mixture was then adjusted to pH 10 with aqueous sodium hydroxide solution (25% by weight in water), admixed with component (C) and stirred at 70° C. for 60 minutes. Thereafter, component (A) was added, followed by stirring at 70° C. for 10 minutes. The mixture was adjusted to pH 8 and made up with completely ion-free water.

It was then stirred with an Ultraturrax T50 (from Jamke & Kunkel) at 4000 rpm for 60 seconds.

To prepare aqueous formulations V-EM.6 to V-EM.8, completely ion-free water was initially charged at 30% by weight, based on the emulsion to be prepared. Component (C) was added and the mixture was heated to 70° C.

The mixture was then adjusted to pH 7 with aqueous sodium hydroxide solution (25% by weight in water), admixed with component (B) and component (V-E.2) and stirred at 70° C. for 60 minutes. Thereafter, component (A) was added, followed by stirring at 70° C. for 10 minutes. The mixture was adjusted to pH 8 with aqueous sodium hydroxide solution and made up with completely ion-free water.

It was then stirred with an Ultraturrax T50 (from Jamke & Kunkel) at 4000 rpm for 60 seconds.

To test the stability of invention and comparator emulsions, they were stirred with hard water (80° German hardness) in a volume ratio of 1:3 and 1:5 for a period of one minute using a magnetic stirrer, and visually examined for stability after one hour and after 12 hours. An emulsion was called stable when it had a uniform appearance. The result is reported in Table 2.

TABLE 2

| Stability of aqueous formulations EM.1 to EM.8 on mixing with hard water | | | | |
|---|---|---|---|---|
| | Hydrophobicizer (emulsion)/80° German hardness water 1:3 | | Hydrophobicizer (emulsion)/80° German hardness water 1:5 | |
| Hydrophobicizer (emulsion) | 1 h | 12 h | 1 h | 12 h |
| EM.1 | stable | stable | stable | stable |
| EM.5 | stable | stable | stable | stable |
| EM.2 | stable | stable | stable | stable |

TABLE 2-continued

Stability of aqueous formulations EM.1 to EM.8 on mixing with hard water

| Hydrophobicizer (emulsion) | Hydrophobicizer (emulsion)/80° German hardness water 1:3 | | Hydrophobicizer (emulsion)/80° German hardness water 1:5 | |
|---|---|---|---|---|
| | 1 h | 12 h | 1 h | 12 h |
| EM.3 | stable | stable | stable | stable |
| EM.4 | stable | stable | stable | stable |
| V-EM.6 | flocculates | flocculates | flocculates | flocculates |
| V-EM.7 | flocculates | flocculates | flocculates | flocculates |
| V-EM.8 | flocculates | flocculates | flocculates | flocculates |

II. Production of Water-Repellent Shoe Upper Leather

Recitations in % are always % by weight and are based on the pickled pelt unless especially stated otherwise. The values in % in the case of active-ingredient formulations are always based on the solids or active content. The leather was produced with hard water of 80° German hardness.

Two commercially available cattlehide wet blues (US-Packers) were shaved to a thickness of 1.7-1.9 mm. The butt region was cut into four strips of about 800 g each. The strips were then admixed in a drum (50 l) and a float length of 200% (based on shaved weight) with 2% of sodium formate and 0.6% of sodium bicarbonate at 10-minute intervals. The leathers were drummed overnight at intervals of 30 minutes for 3 minutes each time. The float was then dropped. The strips were then allocated to separate milling drums.

The separate milling drums were then charged with 200% of water (35° C.). Thereafter, they were admixed with 4% of a 40% by weight aqueous polymethacrylic acid solution ($M_n$ 30 000 g/mol, pH 5.5). Drumming was done for 30 minutes, adding in sequence in each case 5% of mimosa vegetable tannin, 3% of a resin tannin based on melamine condensation products and 1% of a retanning agent based on phenolsulfonic acid condensation products with organic nitrogen bases. After 30 minutes, 3% of a 50% by weight (solids content) aqueous solution of dyes was added, the solids of which had the following composition:
70 parts by weight of dye from EP-B 0 970 148, example 2.18, 30 parts by weight of Acid Brown 75 (iron complex), Colour Index 1.7.16

Thereafter, each separate drum was admixed at 60° C. with 7% of a freshly prepared formulation as per Table 1 and agitated for 30 minutes. This was followed by acidification with formic acid in multiple steps down to pH 3.5 and 20 minutes of further agitation at this pH before the float was dropped. A fresh float (100%-150%) was used to effect a fixation at 40° C. with 3% of commercially available chromium sulfate (Chromitan® B, 33% basic, $Cr_2O_3$ content: 27%) for a period of 90 minutes. This was followed by two washes with 150% of water each time before the leathers were stored overnight and subsequently stretched out, vacuum dried, conditioned and staked.

This gave invention leathers L.1 to L.5 and also comparator leathers L.6 to L.8.

Water repellant precipitated in the drum in the course of the production of comparator leathers L.6 to L.8. Greasiness was observed in the float and on the walls of the milling drums. The precipitations during application caused the leather surfaces to become waxier, spottier and more unlevel (pullup-like effects).

Invention leathers L.1 to L.5 exhibited a level coloration and did not display any pullup-like effects. Water repellant did not precipitate during application. No greasiness was observed in the float or walls.

We claim:

1. A process for producing leather, comprising treating a part-processed hide, a crust leather or a pelt with an aqueous float comprising
   (A) an amphiphilic organic copolymer,
   (B) a silicone compound having a carboxylic acid group or a carboxylic anhydride group per molecule,
   (C) a surface-active compound selected from emulsifiers having a phosphorus atom per molecule,
   (D) a surface-active compound selected from N-acylated amino acids, and
   (E) a surface-active compound comprising a $C_{10}$-$C_{30}$-alkyl radical, branched or unbranched, or a polyisobutene moiety, and an ionic or aqueous-ionizable group, other than the amphiphilic copolymer (A) and the surface-active compound (C),
wherein the float is free of waxes and oils.

2. The process according to claim 1, wherein the surface-active compound (E) has an average molecular weight $M_n$ in the range from 500 to 5500 g/mol.

3. The process according to claim 1, wherein the surface-active compound (E) comprises a polyisobutyl moiety and one or two carboxylic acid groups per molecule.

4. The process according to claim 1, wherein amphiphilic organic copolymer (A) is obtained by copolymerizing
   (a) an ethylenically unsaturated $C_3$-$C_{10}$-carboxylic acid or an ethylenically unsaturated $C_4$-$C_{10}$-dicarboxylic acid or its anhydride,
   (b) a (meth)acrylate of an α-branched $C_3$-$C_{10}$-alkanol, and
   (c) a (meth)acrylate of a primary $C_4$-$C_{20}$-alkanol.

5. The process according to claim 1, wherein N-acylated amino acid (D) is a compound of formula (I)

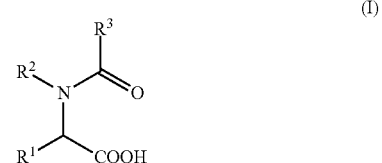

(I)

or a corresponding alkali metal or ammonium salt,
wherein
$R^1$ is selected from the group consisting of hydrogen, $C_1$-$C_4$-alkyl and $C_6$-$C_{14}$-aryl,
$R^2$ is selected from the group consisting of hydrogen and $C_1$-$C_4$-alkyl, and
CO—$R^3$ is an acyl radical derived from mono- or polyethylenically unsaturated fatty acids or from saturated fatty acids.

6. The process according to claim 1, wherein the silicone compound (B) is a polysiloxane comprising structure elements of formulae (II), (III) and optionally (IV a) and (IV b)

(II)

-continued

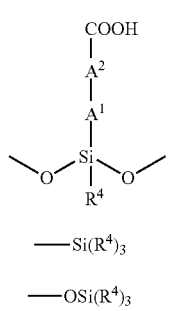

(III)

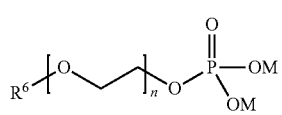

(IV a)

(IV b)

wherein

R$^4$ in each occurrence is the same or different and independently is hydrogen, hydroxyl, C$_1$-C$_4$-alkyl, C$_6$-C$_{14}$-aryl, C$_1$-C$_4$-alkoxy, amino, mono-C$_1$-C$_4$-alkylamino, di-C$_1$-C$_4$-alkylamino or A$^1$-A$^2$-COOH, A$^1$ is a direct bond, oxygen or an amino, carbonyl, amido or ester group, and A$^2$ in each occurrence is the same or different and is linear or branched C$_5$-C$_{25}$-alkylene.

7. The process according to claim 1, wherein the treating is performed at a temperature in the range from 20 to 65° C.

8. The process according to claim 1, wherein the emulsifier (C) comprises a compound of formula (VI)

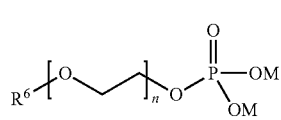

(VI)

wherein

M in each occurrence is the same or different and is selected from the group consisting of hydrogen, alkali metal, and ammonium with optionally an organic radical, n is from 2 to 10, and R$^6$ is selected from the group consisting of C$_{12}$-C$_{30}$-alkyl and C$_{12}$-C$_{30}$-alkenyl, with one to three C—C double bonds.

9. A leather obtained by a process according to claim 1.

10. An aqueous formulation comprising:

(A) an amphiphilic organic copolymer, (B) a silicone compound having a carboxylic acid group or a carboxylic anhydride group per molecule, (C) a surface-active compound selected from emulsifiers having at least one phosphorus atom per molecule, (D) a surface-active compound selected from N-acylated amino acids, and (E) a surface-active compound comprising a C$_{10}$-C$_{30}$-alkyl radical, branched or unbranched, or a polyisobutene moiety, and an ionic or aqueous-ionizable group, other than the amphiphilic copolymer (A) and the surface-active compound (C), wherein the formulation is free of waxes and oils.

11. The aqueous formulation according to claim 10, wherein the surface-active compound (E) has an average molecular weight M$_n$ in the range from 500 to 5500 g/mol.

12. The aqueous formulation according to claim 10, wherein the surface-active compound (E) has a polyisobutyl moiety and one or two carboxylic acid groups per molecule.

13. The aqueous formulation according to claim 10, wherein the amphiphilic organic copolymer (A) is obtained by copolymerizing (a) an ethylenically unsaturated C$_3$-C$_{10}$-carboxylic acid or an ethylenically unsaturated C$_4$-C$_{10}$-dicarboxylic acid or its anhydride, (b) a (meth)acrylate of an α-branched C$_3$-C$_{10}$-alkanol, and (c) a (meth)acrylate of a primary C$_4$-C$_{20}$-alkanol.

14. The aqueous formulation according to claim 10, wherein the N-acylated amino acid (D) is a compound of formula (I)

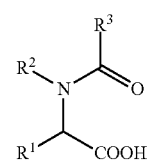

(I)

or a corresponding alkali metal or ammonium salt, wherein

R$^1$ is selected from the group consisting of hydrogen, C$_1$-C$_4$-alkyl and C$_6$-C$_{14}$-aryl, R$^2$ is hydrogen or C$_1$-C$_4$-alkyl, and CO—R$^3$ is an acyl radical derived from mono- or polyethylenically unsaturated fatty acids or from saturated fatty acids.

15. The aqueous formulation according to claim 10, wherein the emulsifier (C) comprises a compound of formula (VI)

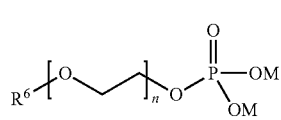

(VI)

wherein

M in each occurrence is the same or different and is selected from the group consisting of hydrogen, alkali metal, and ammonium with optionally an organic radical, n is from 2 to 10, and R$^6$ is selected from the group consisting of C$_{12}$-C$_{30}$-alkyl and C$_{12}$-C$_{30}$-alkenyl, with one to three C—C double bonds.

16. The aqueous formulation according to claim 10, wherein the silicone compound (B) is a polysiloxane comprising structure elements of formulae (II), (III) and optionally (IV a) and (IV b)

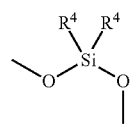

(II)

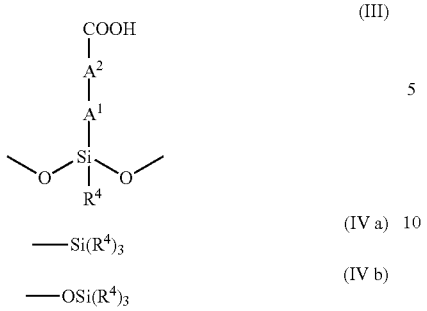 (III)

—Si(R⁴)₃ (IV a)

—OSi(R⁴)₃ (IV b)

wherein

R$^4$ in each occurrence is the same or different and independently is hydrogen, hydroxyl, $C_1$-$C_4$-alkyl, $C_6$-$C_{14}$-aryl, $C_1$-$C_4$-alkoxy, amino, mono-$C_1$-$C_4$-alkylamino, di-$C_1$-$C_4$-alkylamino or A$^1$-A$^2$-COOH, A$^1$ is a direct bond, oxygen or an amino, carbonyl, amido or ester group, and A$^2$ in each occurrence is the same or different and is linear or branched $C_5$-$C_{25}$-alkylene.

17. The aqueous formulation according to claim 10, wherein the formulation is suitable for production of aqueous floats for producing leather.

* * * * *